US010089240B2

(12) United States Patent
Sohi et al.

(10) Patent No.: US 10,089,240 B2
(45) Date of Patent: Oct. 2, 2018

(54) CACHE ACCESSED USING VIRTUAL ADDRESSES

(71) Applicant: Wisconsin Alumni Research Foundation, Madison, WI (US)

(72) Inventors: Gurindar S. Sohi, Madison, WI (US); Hongil Yoon, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 59 days.

(21) Appl. No.: 14/867,926

(22) Filed: Sep. 28, 2015

(65) Prior Publication Data

US 2016/0188486 A1    Jun. 30, 2016

Related U.S. Application Data

(60) Provisional application No. 62/096,962, filed on Dec. 26, 2014, provisional application No. 62/097,342, filed on Dec. 29, 2014.

(51) Int. Cl.
*G06F 12/00* (2006.01)
*G06F 12/1009* (2016.01)
(Continued)

(52) U.S. Cl.
CPC .......... *G06F 12/1009* (2013.01); *G06F 3/061* (2013.01); *G06F 3/0638* (2013.01);
(Continued)

(58) Field of Classification Search
CPC .. G06F 12/1009; G06F 12/0893; G06F 3/061; G06F 3/0638; G06F 3/0664;
(Continued)

(56) References Cited

U.S. PATENT DOCUMENTS 5,668,968 A * 9/1997 Wu ...................... G06F 12/1045
711/122
5,930,833 A * 7/1999 Yoshioka ............ G06F 12/1063
711/141
(Continued)

FOREIGN PATENT DOCUMENTS

WO        2013058745 A1    4/2013

OTHER PUBLICATIONS

Basu et al.; "Reducing memory reference energy with opportunistic virtual caching." In ACM SIGARCH Computer Architecture News, vol. 40, No. 3, pp. 297-308. IEEE Computer Society, 2012. US.
(Continued)

*Primary Examiner* — Tuan Thai
*Assistant Examiner* — Tasnima Matin
(74) *Attorney, Agent, or Firm* — Boyle Fredrickson, S.C.

(57) ABSTRACT

A computer architecture provides a memory cache that is accessed not by physical addresses but by virtual addresses directly from running processes. Ambiguities that can result from multiple virtual addresses mapping to a single physical address are handled by dynamically tracking synonyms and connecting a limited number of virtual synonyms mapping to the same physical address to a single key virtual address that is used exclusively for cache access.

26 Claims, 4 Drawing Sheets

(51) Int. Cl.
  *G06F 3/06* (2006.01)
  *G06F 12/0802* (2016.01)
  *G06F 12/0893* (2016.01)

(52) U.S. Cl.
  CPC .......... *G06F 3/0664* (2013.01); *G06F 3/0673* (2013.01); *G06F 12/0802* (2013.01); *G06F 12/0893* (2013.01); *G06F 2212/1016* (2013.01); *G06F 2212/50* (2013.01); *G06F 2212/608* (2013.01); *G06F 2212/68* (2013.01)

(58) Field of Classification Search
  CPC ............... G06F 3/0673; G06F 12/0802; G06F 2212/608; G06F 2212/68; G06F 2212/1016; G06F 2212/50
  USPC ......................................................... 711/118
  See application file for complete search history.

(56) References Cited

U.S. PATENT DOCUMENTS

| | | | |
|---|---|---|---|
| 2003/0023814 | A1 | 1/2003 | Barroso et al. |
| 2004/0117591 | A1* | 6/2004 | Arimilli ................ G06F 12/08 711/203 |
| 2006/0026385 | A1* | 2/2006 | Dinechin ............ G06F 12/1036 711/210 |
| 2006/0101227 | A1 | 5/2006 | Willis et al. |
| 2008/0082721 | A1* | 4/2008 | Yu ...................... G06F 12/0864 711/3 |
| 2013/0013856 | A1 | 1/2013 | Rogers et al. |
| 2016/0188486 | A1* | 6/2016 | Sohi ...................... G06F 3/061 711/118 |
| 2016/0224471 | A1* | 8/2016 | Avudaiyappan .... G06F 12/1054 |

OTHER PUBLICATIONS

Cekleov et al.; "Virtual-address caches. Part 1: problems and solutions in uniprocessors," Micro, IEEE 17, No. 5 (1997): 64-71. US.

Cekleov et al.; "Virtual-address caches, part 2: Multiprocessor issues." IEEE Micro 6 (1997): 69-74. US.

Chase et al.; "Sharing and protection in a single-address-space operating system." ACM Transactions on Computer Systems (TOCS) 12, No. 4 (1994): 271-307. US.

Chase et al.; "Lightweight shared objects in a 64-bit operating system." In ACM SIGPLAN Notices, vol. 27, No. 10, pp. 397-413, ACM, 1992. US.

Goodman; "Coherency for multiprocessor virtual address caches." In ACM SIGARCH Computer Architecture News, vol. 15, No. 5, pp. 72-81. IEEE Computer Society Press, 1987. US.

Kaxiras et al.; "A new perspective for efficient virtual-cache coherence." In ACM SIGARCH Computer Architecture News, vol. 41, No. 3, pp. 535-546, ACM, 2013. Israel.

Kim et al.; "U-cache: a cost-effective solution to synonym problem." In High-Performance Computer Architecture, 1995. Proceedings., First IEEE Symposium on, pp. 243-252, IEEE, 1995. Korea.

Koldinger et al.; Architecture suppor for single address space operating systems. vol. 27, No. 9, ACM, pp. 175-186; 1992. US.

Qiu et al.; "The synonym lookaside buffer: A solution to the synonym problem in virtual caches." Computers, IEEE Transactions on 57, No. 12 (2008): 1585-1599. US.

Sembrant et al.; "The Direct-to-Data (D2D) cache: navigating the cache hierarchy with a single lookup." In Proceeding of the 41st annual international symposium on Computer architecuture, pp. 133-144. IEEE Press, 2014.

Sembrant et al.; "Tlc: A tag-less cache for reducing dynamic first level cache energy." In Proceedings of the 46th Annual IEEE/ACM International Symposium on Microarchitecture; pp. 49-61, ACM, 2013. US.

Wang et al.; Organization and performance of a two-level virtual-real cache hierarchy. vol. 17, No. 3. ACM, pp. 140-148; 1989. US.

Woo et al.; "Reducing energy of virtual cache synonym lookup using bloom filters." In Proceedings of the 2006 international conference on Compilers, architecture and synthesis for embedded systems, pp. 179-189. ACM, 2006. Korea.

Wood et al.; "An in-cache address translation mechanism." In ACM SIGARCH Computer Architecture News, vol. 14, No. 2, pp. 358-365. IEEE Computer Society Press, 1986. US.

Zhang et al.; "Enigma: architectural and operating system support for reducing the impact of address translation." In Proceedings of the 24th ACM International Conference on Supercomputing, pp. 159-168. ACM, 2010.

\* cited by examiner

CACHE ACCESSED USING VIRTUAL ADDRESSES

CROSS REFERENCE TO RELATED APPLICATION

This application claims the benefit of U.S. provisional applications 62/096,962 filed Dec. 26, 2014, and 62/097,342 filed Dec. 29, 2014, and hereby incorporated in their entirety by reference.

BACKGROUND

The present invention relates to computer architectures and in particular to an improved computer architecture providing for a memory cache that allows access of cache contents by virtual addresses rather than physical addresses.

Cache memories are used to minimize the time required for a processor to access memory data by providing relatively compact, quickly accessed memory structure close to the processor. Portions of the main memory are loaded into the cache memory with the expectation that temporally proximate memory accesses will tend to cluster in the loaded portion (locality of reference) thus allowing the cache memory, once loaded, to serve multiple memory accesses by the processor before needing to be reloaded. Often multiple levels of cache (e.g., L1, L2, L3) may be used to optimize the trade-offs between rapid access and limited storage inherent in the cache structure.

To access a data in a cache memory, a set of bits from a first set of address bits for the data, generally called the index bits, is used to index into the cache and select a line at an indexed entry. A set of bits from a second set of address bits, generally called the tag bits, is then compared against a set of tag bits corresponding to a selected entry and a hit declared if the set of bits from the second set of address bits match the selected set of tag bits.

Programs running on modern processors normally access (read or write) memory using virtual addresses that differ from the physical address of the data in memory. The use of virtual addresses greatly simplifies running multiple programs by allowing them to view a continuous memory space unaffected by allocation to other processes, allowing physical memory to be allocated only to active virtual addresses and preventing the corruption of memory space from one process by the operation of another process, as is known in the art.

The use of virtual address space, despite its advantages, increases the delay in accessing memory by requiring a translation from virtual address space used by the programs to physical address space required by the computer memory. Normally this translation is done by means of page tables having entries that cross-reference each virtual address space to the physical address space. Normally a page table entry may also contain access permissions for data in the corresponding virtual page. The page tables may be augmented by a translation lookaside buffer (TLB) that serves to cache recently accessed entries from the page table to speed up the process of translating the addresses and checking the requisite access permissions. The TLB may be optimized for low access latency and for low miss rate by employing a fast, highly associative structure.

In a system with virtual memory, the cache memory is nevertheless normally accessed by physical memory addresses, that is, the first and second set of bits of address (e.g., index and tag) used to access the data in the cache are both part of a same physical address While the latency of the address translation using the TLB and page tables is tolerable for the main memory, it is more burdensome when used with a cache memory which is intended to provide frequent and rapid access that can be significantly slowed by address translation. Furthermore, the translation with a highly associative TLB will be energy hungry.

Ideally, the cache could be accessed directly using a virtual address from a program, that is, where the first and second set of bits (e.g. index and tag) used to access the data in the cache are both parts of the same virtual addresses. The use of a virtual address to access cached data can obviate the latency and energy overhead resulting from TLB lookups; however it is complicated by the possibility of synonyms that is a group of distinct virtual addresses mapped to the same physical address. This aliasing (or overlapping) is possible and desirable to efficiently manage data in (physical or main) memory, for example, shared information across different processes with distinct virtual address spaces. In such cases, the use of virtual addressing for the cache could permit multiple different cache entries mapping to the same physical address (synonym virtual addresses), that is, holding the same data under distinct virtual addresses. Allowing the duplicates reduces the cache capacity. This also presents a consistency problem among them. For example, if one process updates data associated with the common physical address using the first cache location, then a second process cannot read the up-to-date value for the common physical address using the second cache location.

One solution to this problem, inherent in caches using virtual addresses for cache access, is to prohibit virtual address aliasing (or overlapping) in the physical address domain. For example, one can prevent data from a single physical address from being cached with different virtual addresses in a cache. This solution greatly decreases the ability of the cache to exploit locality of reference to the data. Similarly, one can prevent data from the same physical page from being cached with different virtual addresses in a cache, especially if the data could be written to. Alternatively, one can employ a single global virtual address space that eliminates the occurrence of synonyms itself Each of these solutions places large demands on software, which greatly limits its practical utility.

Another commonly used solution is what is referred to as a virtually-indexed physically-tagged (VIPT) cache in the prior art. Here a first set of bits used to index into the cache to select an entry is part of a virtual address and a second set of bits used to compare against the tag bits of the selected entry is part of a physical address corresponding to the virtual, address. This solution exploits the observation that some low-order bits of a virtual address (the page offset bits) do not change as a result of the address translation. Thus these low-order bits of the virtual address (which are the same as that of the corresponding physical address) can be used to index into the cache and start the access of the data and tag bits residing in the corresponding entry. In parallel the TLB is accessed to obtain the physical address. When both operations have completed, the physical address bits obtained from the TLB access are compared with the physical address bits stored in the cache tags, and a hit declared if they match. This approach may decrease the latency of the cache access, since the TLB is accessed in parallel with, rather than prior to, the cache access. However, the TLB access energy is still expended and thus the energy benefits of a cache accessed with virtual addresses is not obtained. Moreover, the limits placed on the number of bits used to index the cache (these bits should not change as a result of the address translation) restricts the organization of the cache, potentially requiring a higher degree of associativity than may be desirable to achieve energy efficiency.

What is desirable is to have a cache that can be accessed with a virtual address so that a first address used to index into the cache and select an entry and a second address used to compare against the selected tag bits and to declare a hit are both parts of the same virtual address. Thus a data access that hits in the cache can be completed solely using a virtual address, without the need to access the TLB or perform a virtual to physical address translation. Such a cache would have significant access latency and/or energy consumption advantages over designs that employed a physical address to complete the cache access. Moreover, it is also desirable that the operation of such a cache be transparent to software and that no requirements be placed on software to ensure its correct operation.

SUMMARY

The present inventors have recognized that in many important computational tasks while synonyms are present over the duration of the program, within a short period of time comparable to the time a data is resident in a cache: (1) there are very few synonyms mapped to the same physical address, and (2) very few of the accesses to the cache are to data with synonyms. The present invention exploits these observations by accessing the cache directly with a given virtual address and then detecting synonym virtual addresses and efficiently converting the synonym virtual address to a selected key virtual address prior to cache access. It is practical to track synonyms with modest size data structures because of the relative scarcity of synonyms during the life of cached data.

Specifically, the invention provides an electronic processor architecture for use with a memory having storage at physical addresses. The architecture includes a processor, a memory cache, a cache control circuit caching memory data of physical addresses in the memory cache by virtual addresses, and a translation circuit for translating between a virtual address from the processor and a physical address. In addition, the architecture includes a synonym tracking circuit receiving a given virtual address from the processor for access to the cache and: (1) determining if the given virtual address is a synonym with an other virtual address mapping to a same given physical memory address of data in the cache; and (2) when the given virtual address is a synonym, accessing the memory cache using the other virtual address as an accessing address for the memory cache.

It is thus a feature of at least one embodiment of the invention to accommodate possible aliasing or overlapping of virtual addresses in a cache accessed using virtual addresses by tracking synonyms and making all cache requests using a single designated (key) virtual address.

When the given virtual address is not a synonym with another virtual address, the synonym tracking may access the memory cache using the given virtual address as the accessing address for the memory cache.

It is thus a feature of at least one embodiment of the invention to permit faster direct access to the cache using virtual memory addresses in the dominant situation where there are no synonyms.

The cache controller may prepare for access of the memory cache using the given virtual address in parallel with the synonym tracking circuit determining if the given virtual address is a synonym with another virtual address.

It is thus a feature of at least one embodiment of the invention to reduce the delay attendant to synonym tracking when there are no synonyms.

The synonym tracking circuit may include a first table of virtual addresses (termed the ART) that are synonyms to determine if a given virtual addresses is a synonym with another virtual address mapped to the same physical memory address of data.

It is thus a feature of at least one embodiment of the invention to provide a simple and compact method of monitoring synonyms consistent with the expected low number of active synonyms in a short timeframe.

The synonym tracking circuit may include a compressed signature of the first table indicating whether a given virtual address is likely in the first table and the synonym tracking circuit may first check the compressed signature and may check the first table only if a compressed signature indicates that the given virtual address is likely in the first table.

It is thus a feature of at least one embodiment of the invention to shortcut complete review of the first table in the common situation where there are no synonyms.

The synonym tracking circuit may respond to a cache miss of the memory cache by determining a physical address associated with the given virtual address and applying the determine physical address to a second table linking a physical address and a designated (key) virtual address, and when the determined physical address links to a (key) virtual address in the second table using the virtual address of the second table as an accessing address for the memory cache.

It is thus a feature of at least one embodiment of the invention to also permit the identification of "hidden" synonyms by the common physical address when the synonyms are not linked by virtual addresses in the first table.

The synonym tracking circuit may use a translation lookaside buffer and page table to convert the accessing address to a physical address.

It is thus a feature of at least one embodiment of the invention to leverage existing translation circuitry (e.g. the TLB) for the purpose of determining synonyms.

The first table, the second table, and a cache line may include a memory access permission linked to a virtual address.

It is thus a feature of at least one embodiment of the invention to handle memory access permissions for a cache accessed by virtual addresses without the need to consult page table information as is made possible by the present invention.

The electronic processor may be an out of order processor using a load queue and a store queue and the load queue and store queue may store data linked to a key virtual address.

It is thus a feature of at least one embodiment of the invention to permit virtual addresses to be used in a load queue and a store queue without the risk of potential errors in program execution. Lines of the cache memory may hold an index to a corresponding entry of the second table linked to a corresponding virtual address, and the synonym tracking circuit may receive this index to update an entry in the second table when lines of a cache memory are evicted.

It is thus a feature of at least one embodiment of the invention to eliminate the need for a translation of virtual addresses into physical addresses in order to coordinate the updating of entries in the second table.

These particular objects and advantages may apply to only some embodiments falling within the claims and thus do not define the scope of the invention.

DETAILED DESCRIPTION

Figure 1:
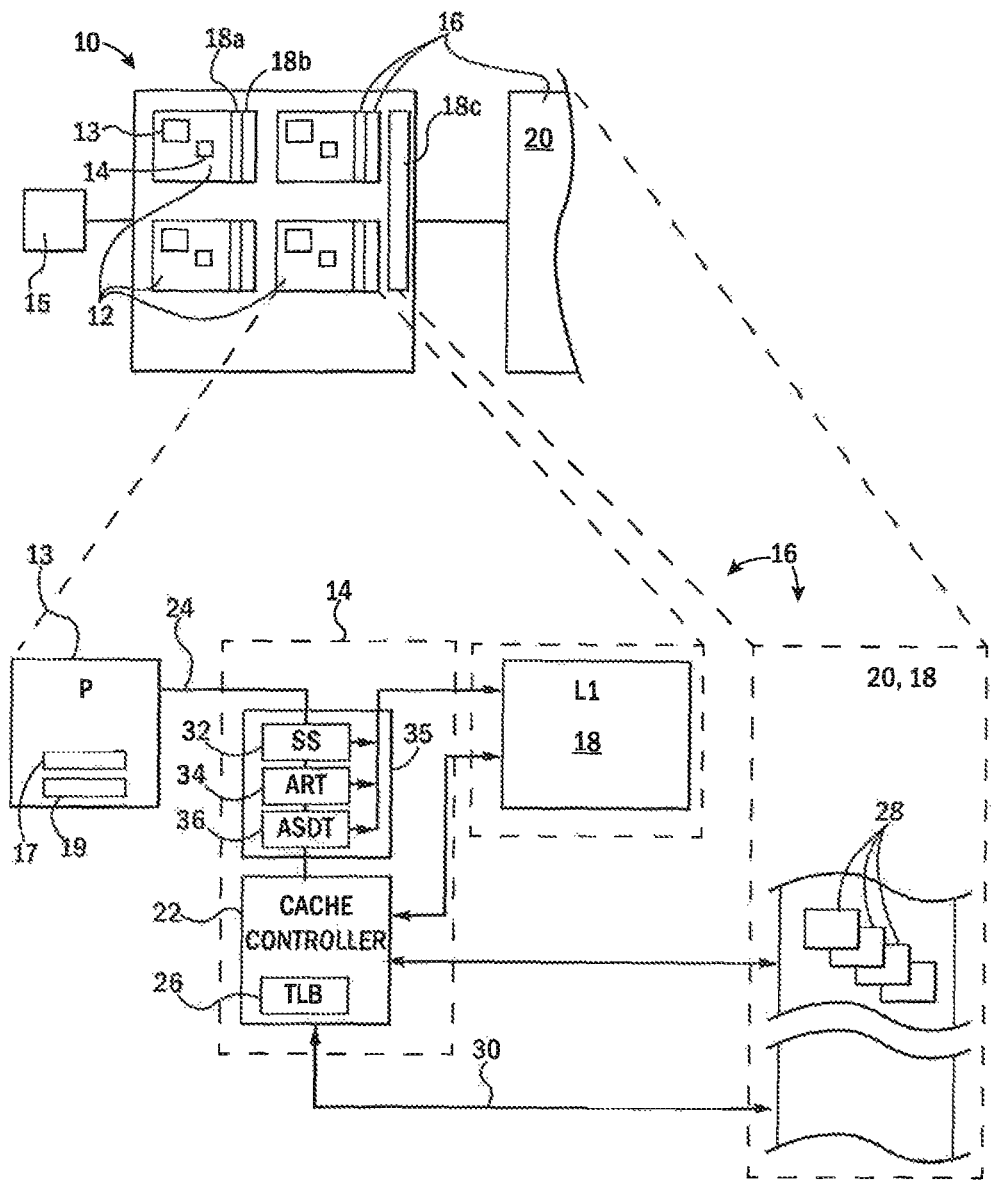
FIG. 1 is a block diagram of a computer architecture employing a cache responding to virtual addresses per the present invention showing a memory management unit employing a cache controller, a translation lookaside buffer, and synonym tracking circuitry.

Referring now to FIG. 1, a computer processing system 10 may provide for one or more processor systems 12 communicating with a memory system 16 composed of various elements to be described below and other devices 15 such as networks, terminals, or the like.

Each processor system 12 may include a processor 13 communicating through a memory management unit (MMU) 14 with the memory system 16 and specifically with one or more caches 18 such as an L1 cache 18a and an L2 cache 18b, The processor system 12 may have a lower level cache (e.g., an L3 cache 18c) that in turn communicates with physical memory 20 including random access memory disk drives and the like. The processor 13 may provide for the ability to execute standard computer instructions including arithmetic and logical operations, memory accessing operations, as well as flow control operations including conditional branches and the like. The processor 13 may include a load queue 17 and a store queue 19 as will be described below providing a function generally understood in the art.

The MMU 14 may include cache controller 22 providing for the updating of the cache 18 from the physical memory 20 including evicting and loading lines of the cache 18 according to techniques generally understood in the art. As will be discussed in greater detail below, the MMU 14 stores data in the cache 18a so that it can be accessed by virtual addresses rather than the physical addresses. Data may be stored in other caches 18b and 18c, for example, so that it may be accessed by virtual addresses or by physical addresses. In this regard, the cache controller 22 may communicate with a translation lookaside buffer (TLB) 26 capable of determining a mapping from the virtual address space of the virtual address Vb to the physical address space of the physical memory 20 to provide a physical address Pb. This physical address Pb will ultimately be used to access the physical memory 20 over lines 30 if there is a cache miss at the cache 18. In the following discussion, virtual addresses (e.g. Vb) will be used to refer to both the entire virtual address necessary to uniquely identify stored data and to a subset of the virtual address used for indexing the structures such as the cache 18. The particular usage will be evident from context.

As will be understood in the art, the TLB 26 provides a cache with recent translations between virtual address space and physical address space. If a mapping for the particular virtual address Vb is not found in the TLB 26, the cache controller 22 may consult with one or more page tables 28 and, by doing a "page walk", may obtain the necessary translation. Access to the TLB 26 or the page tables 28 is time and energy-consuming and desirably avoided. The page table 28 may be stored in part in the caches 18 and in part in physical memory 20 indicted generally by the dotted box labeled 20, 18.

The MMU 14 also includes a synonym circuit 35 that in one embodiment may include an active synonym signature (SS) 32, a first table providing an Address Remapping Table (ART) 34, and a second table providing an Active Synonym Detection Table (ASDT) 36 as will be discussed in detail below.

Overview of Cache Access Using Virtual Addresses

The MMU 14 receives memory access requests from the processor 13 over address lines 24, the requests including a virtual address (Vb) of the data to be accessed. These requests may be sent to the SS 32 and to the ART 34 of the synonym circuit 35 which determine if Vb is in fact an active synonym of another active virtual address (a key virtual address) which is being used to access the same data in the cache 18. The term "active" refers to virtual addresses that map to data currently in the cache 18.

If the SS 32 indicates that there is no active synonym, the virtual address Vb is used to access directly a cache 18 with the expectation that the virtual address Vb is a key virtual address.

On the other hand, if the SS 32 indicates that Vb may be an active synonym, the virtual address Vb is passed to an Address Remapping Table (ART) 34 which confirms this relationship and identifies a key virtual address (e.g. Va) for which Vb is a synonym.

Upon identifying an active key virtual address, Va is used instead to access the memory cache 18.

The above procedure allows direct access by the processor 13 to the cache 18 using virtual addresses without processing by the TLB 26 or the need to do a walk through the page tables 28 in most cases, including the case where Vb is a synonym of another active virtual address (a key virtual address) or Vb is a key virtual address.

If there is a cache miss at memory cache 18, the cache controller 22 refers to the ASDT 36 to determine if there may be an unknown synonym to Vb not currently identified by SS 32 or ART 34, but detectable by comparing a given virtual address (Vb) against a known, active, key virtual address mapped to the same physical address Px. If such a hidden synonym is detected, and the necessary cache line 71 is available per the ASDT 36, the memory cache 18 is accessed again using the key virtual address Va. Otherwise the access is submitted to other levels of the cache or to physical memory 20 and when this access is complete, the acquired data is stored in the cache 18 indexed to the virtual, address Va. In either case, SS 32, ART 34, and ASDT 36 are updated as needed.

Detailed Discussion of Virtual Cache Operation

Figure 2:
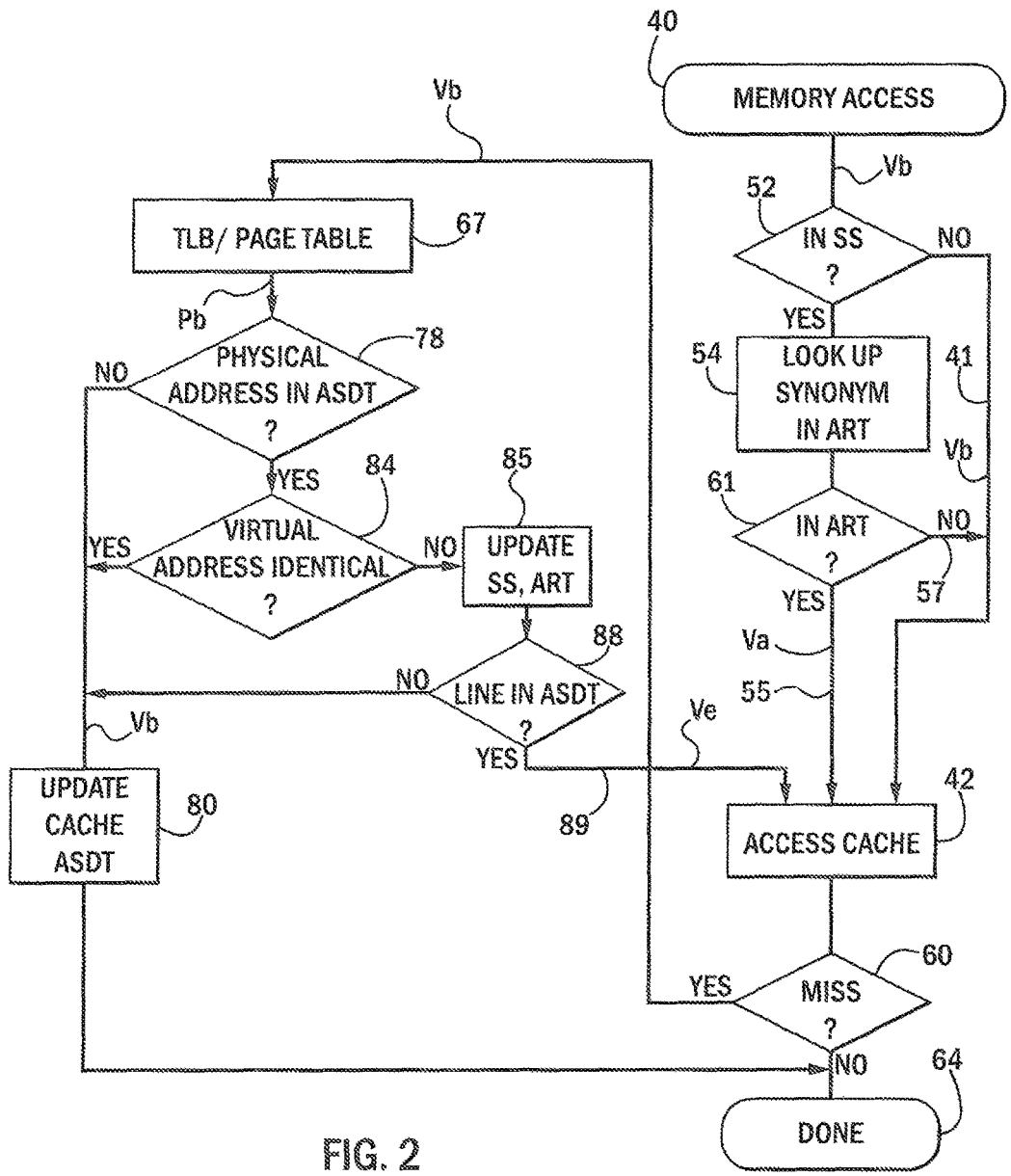
FIG. 2 is a flowchart of the operation of the memory management unit responding to the memory access request and having a virtual address.

Referring to FIG. 2, the MMU 14 may receive a given virtual address Vb for memory access as indicated by process block 40. This given virtual address Vb is, in a preferred embodiment, checked against the SS 32 per decision block 52.

Figure 3:
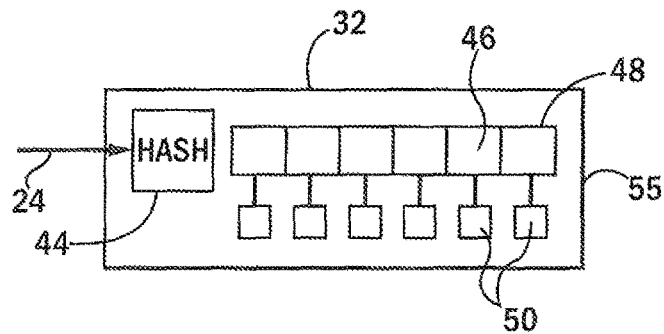
FIG. 3 is a diagram of a synonym signature used in the synonym tracking circuitry.

Referring also to FIG. 3. upon receipt of the given virtual address Vb, the SS 32 processes the given virtual address Vb, for example, by hashing the given virtual address Vb using a hash coder 44 to generate a pointer to a specific bit 46 of a bit vector 48 in the SS 32. That pointed-to bit 46 will be set if Vb is likely an active synonym virtual address. This indicates that there is likely to be an entry for that given virtual address Vb in the ART 34. The hash indexing is extremely fast but will only provide a likelihood of success with the ART 34 and does not indicate the synonym which requires review of the ART 34 as will be discussed below.

In the SS 32, each bit 46 of the bit vector 48 may be associated with a hit counter 50 indicating the number of associated entries in the ART 34 (or virtual addresses mapping to that bit 46 in the ART 34). This counter value of counter 50 allows the bit vector 48 to be updated to reset bits 46 that are no longer the hash of valid synonym data in the ART 34. The counter 50 also prevents the reset of bits 46, in the case where the hash coder 44 maps multiple synonyms to the same bit 46, before all synonyms are evicted from the ART 34.

At decision block 52, if the relevant bit 46 in the SS 32 indicates that Vb is not an active synonym virtual address, the cache 18 is accessed directly at process block 42 as indicated by arrow 41 using Vb.

At decision block 52, if the relevant bit 46 in the SS 32 indicates a likelihood that Vb is a synonym virtual address, then the MMU 14 proceeds to process block 54 and the ART 34 is used to identify a key virtual address with which the synonym virtual address Vb is associated.

Figure 4:
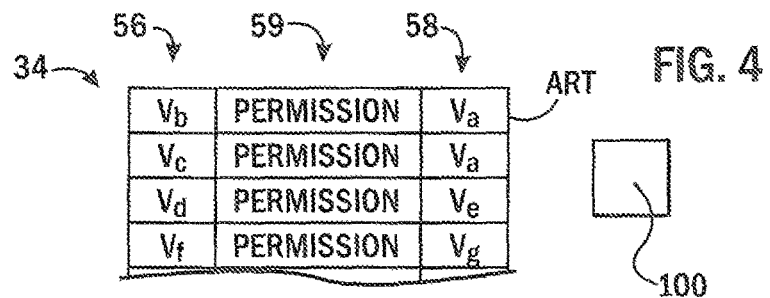
FIG. 4 is a diagram of an address remapping table used in the synonym tracking circuitry.

Referring now also to FIG. 4, the ART 34 may provide multiple entries represented as rows each corresponding to a synonym virtual address 56 to which the received virtual address over address lines 24 (of FIG. 1) will be compared. Any "known" active synonym virtual addresses 56 (e.g. Vb) will be listed in the ART 34 and will map to a single key virtual address 58 (e.g., Va) also in the ART 34. The ART 34 may also hold memory access "permissions" 59 operating to control whether particular memory addresses (e.g., Vb) may be read or written to and being a standard of memory management known in the art.

Upon application of the virtual address Vb to the ART 34, the permissions 59 of the ART 34 are evaluated to confirm that the memory access is proper. If not, an error is generated resulting in handling the request as a memory access violation exception as is understood in the art.

If the permissions 59 allow the desired access, then at decision block 61 it is determined if there is a matching of the virtual address Vb to a synonym Va according to one of the synonym virtual addresses 56 in the ART 34. If there is such a match, the corresponding key virtual address 58 (e.g., Va), is applied directly to the cache 18 per arrow 55.

If there is no matching synonym in the ART 34 for the virtual address Vb at decision block 61, then the virtual address Vb is supplied directly to the cache 18 per arrow 57.

Figure 6:
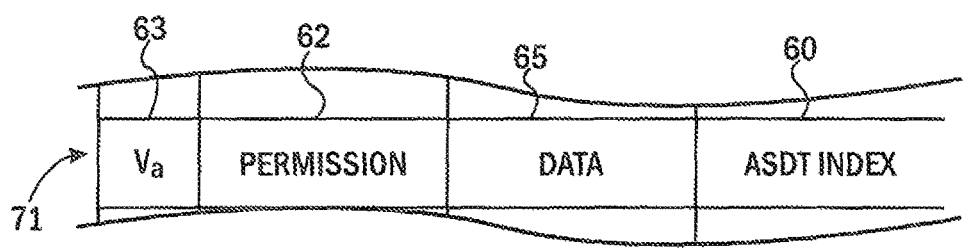
FIG. 6 is a diagram of a single cache line entry in the cache.
Figure 7A:
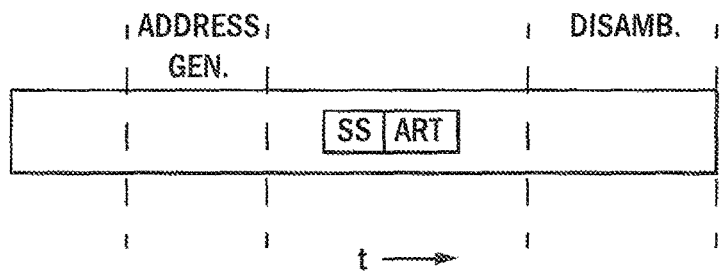
FIGS. 7a-7d show multiple embodiments in which access to the synonym tracking circuitry and address remapping table are distributed in a pipeline processor.
Figure 7B:
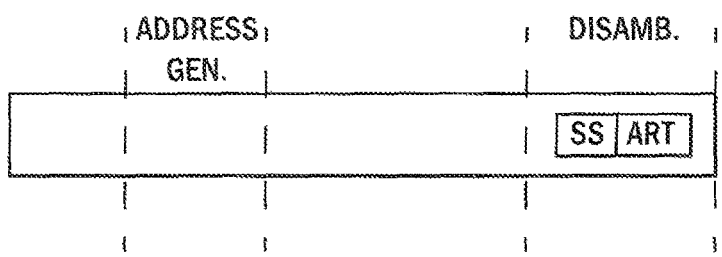
Figure 7C:
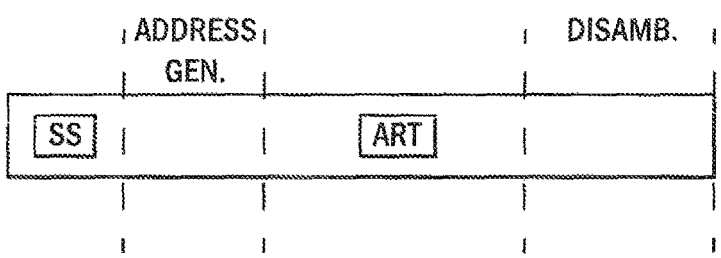
Figure 7D:
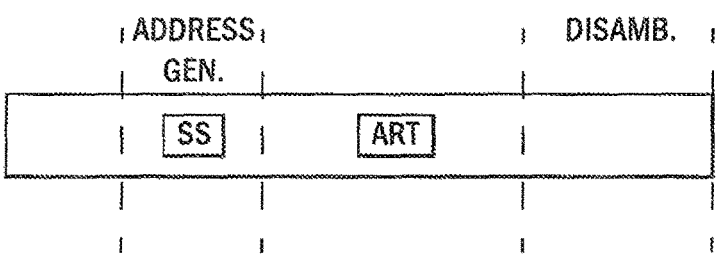

Referring now to FIG. 6, each cache line 71 in the cache 18 may provide for a set of tag bits from a virtual address 63 to which data 65 of that cache line 71 is associated. That is, the cache 18 is both virtually indexed and virtually tagged as opposed to cache structures that are virtually indexed but physically tagged and which require TLB access for correct functioning. The cache line 71 may also provide for permission data 62 and an entry identification index value 69 for the ASDT 36 as will be discussed below.

Upon completion of the cache accessing process of process block 42, there may be a successful cache hit (no cache miss) as detected at decision block 60. In the case where a synonym was found in the ART 34, the permission data 62 in the cache line 71 are ignored in favor of the permissions 59 in the ART 34. In the case where no synonym was found in the ART 34, the permission data 62 is employed to determine whether the access should be allowed. If the access permissions do not permit the desired access in this case, an error is generated resulting in the request being handled as a memory access violation exception as is understood in the art. Otherwise, the data 65 is accessed and the access process is complete as indicated by process block 64.

If a cache miss is detected at decision block 60, meaning that there was no entry in the cache 18 indexed to Vb (or Va), the cache controller 22 proceeds to process block 67. At process block 67 the given virtual address Vb is applied to the TLB 26 (and possibly to the page tables 28) to obtain a corresponding physical address (e.g., Pb) associated with that given virtual address Vb. This physical address Pb will then be applied to the ASDT 36 to look for "hidden" synonyms.

Figure 5:
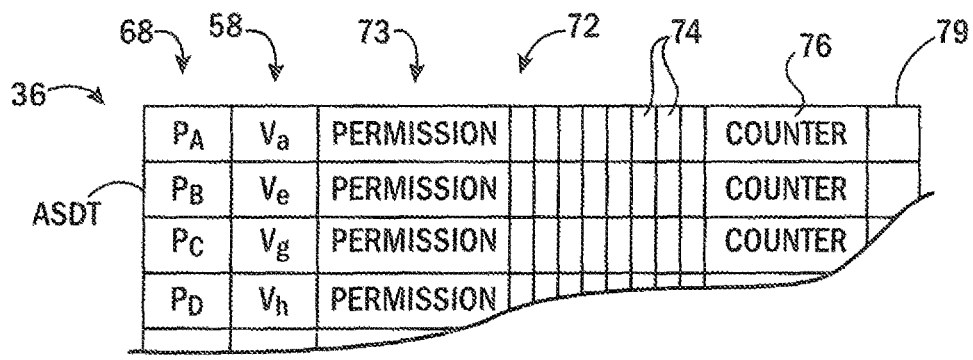
FIG. 5 is a diagram of an active synonym detection table used in the synonym tracking circuitry.

Referring now also to FIG. 5, the ASDT 36 may provide for a logical table having multiple entries represented as rows corresponding to active physical addresses 68 (Px) known to be in the cache 18. Also in each row of the ASDT 36, and thereby linked to a physical address Px, is a single key virtual address 58 for that physical address 68. The ASDT 36 may also include permissions 73 similar to those described above providing access permissions for the data associated with the key virtual address 58.

Each row of the ASDT 36 may also include a bit vector 72 indicating particular lines of the physical address in the cache 18 associated with each physical address Px. The bit vector 72 thus provides for line level resolution in the identification of the data in the cache 18. For example, when the physical address 68 is a page (e.g. four kilobytes), each bit 74 of the bit vector 72 will be set when a corresponding line (64 bytes) of the page is enrolled in the cache 18.

A counter 76 may provide for the sum of the number of bits 74 set in the bit vector 72 so that the entry of the row of ASDT 36 may be invalidated when all lines in the cache 18 have been evicted and the counter has a value of zero for a particular physical address Px. The counter 76 thus acts like a valid bit that may be used to evict rows of the ASDT 36 when they are no longer useful, in updating the ASDT 36 described below. The ASDT 36 may also include an active synonym detection bit 79 as will be discussed below.

It may also be necessary to evict a valid line of the ASDT 36 when there is no available entry for a new line that must be stored. Page information changes (e.g. changes in physical address 68 or permissions 59) or a flushing of the cache 18 may also trigger invalidation of otherwise valid lines of the ASDT 36 requiring that all corresponding lines in the cache 18 must be evicted. The related active synonyms in the ART 34 and SS 32 must also be evicted. This process may be assisted through the use of active synonym detection bit 79 discussed above with respect to the ASDT 36. In an alternative embodiment the ART/SS may be entirely flushed at this time.

At decision block 78, if the physical address Pb from process block 67, as applied to the ASDT 36, does not match with one of the active physical addresses 68 associated with data in the cache 18, then new data will need to be added to the cache 18 and the cache 18 is updated, as well as the ASDT 36, per process block 80, as will be described further below.

On the other hand, at decision block 78, if the physical address Pb is found in the ASDT 36, at decision block 84, a determination is made whether the given virtual address Vb is identical to a key virtual address 58 in the ASDT 36 and associated with Pb.

If at decision block 84, the given virtual address Vb is in the ASDT 36, then it must be assumed that the cache miss is caused by failure of the proper line of the physical address Pb from being in the cache 18. This requires new data to be added to the cache 18 and the cache 18 is updated as well as the ASDT 36 per process block 80.

On the other hand, if at decision block 84, the given virtual address Vb is not in the ASDT 36, the role of Vb as a synonym to the key virtual address that is in the ASDT 36 (e.g., Ve) is memorialized by updating the ART 34 and the SS 32 appropriately at process block 85. At this time the active synonym detection bit 79 in the ASDT 36 may be set. The ASDT 36 is then checked to see if the necessary cache line 71 required by given virtual address Vb is in the memory cache 18 (e.g. by checking whether the corresponding bit 74 of the bit vector 72 is set in the ASDT 36). If so, as indicated by line 89, access to the cache 18 may be provided by process block 42 using a key virtual address Ve discovered in the ASDT 36.

If at decision block 88, the needed line is not in the ASDT 36, then the cache 18 and ASDT 36 are updated per process block 80.

At process block 80 the cache controller 22 is allowed to update the cache 18 and if that updating is successful the ASDT 36 is updated appropriately. When the ASDT 36 did not have the desired data under any virtual address ("No" at decision block 78), this updating adds to the ASDT 36 the physical address Pb in the first column and the given virtual address Vb in the second column associated with that updating (which will now be a key virtual address 58) and the appropriate bit 74 of the bit vector 72 set and counter 76 incremented. The appropriate bit 74 may be deduced from an offset value derivable from the given virtual address Vb. When the ASDT 36 has an entry for the page of the given physical address (Pb) but does not contain the necessary data line ("Yes" at decision block 84) the appropriate bit 74 of bit vector 72 for the newly enrolled data in the cache 18 is set and the counter 76 incremented. When the ASDT 36 has an entry for the page of the given physical address (Pb) but linked to a different virtual address (Ve) and without the necessary data line ("No" at decision block 88) the appropriate bit 74 of the bit vector 72 of the newly enrolled data in the cache 18 is set, the counter 76 incremented and the ART 34 and SS 32 adjusted appropriately to reflect this new synonym.

A victim entry of the ASDT 36 may be determined by looking at the ASDT 36 to select a physical address 68 associated with an invalid row of the ASDT 36 (i.e., with counter 76 equaling zero) or a row with a non-zero counter value. In the former case, the invalid row having a counter of zero indicates that there are no valid lines still relied upon in the cache 18. In the latter case, the determination of the victim entry to be evicted can be carried out using any number of a variety of policies known in the art. When an entry with a non-zero counter value is chosen to be evicted from the ASDT, the lines tracked by that entry that are still resident in the cache (which may be indicated by a non-zero value in the corresponding bits 74 of bit vector 72) are first evicted from the cache 18, thereby bringing the counter value down to zero and thus allowing the ASDT entry to be evicted without problems. When an entry in the ASDT is to be evicted, the associated entries in the ART and the SS also need to be invalidated and/or updated as needed.

Generally, the cache 18 is substantially the same as a normal cache, however, accessed by virtual addresses. Virtual addresses may be combined with address space identifiers (ASID) as is generally understood in the art to address the homonym issue.

Referring now to FIGS. 1, 2, 5 and 6, when the cache 18 must be updated and a cache line 71 evicted, the ASDT 36 entry corresponding to the evicted line must be identified so that the corresponding bit 74 in the bit vector 72 may be updated and the corresponding counter 76 decremented. Identifying the corresponding line in the ASDT 36 may be complicated by the tact that the line to be evicted is identified by a virtual address 58 while the ASDT is most simply accessible via a physical address 68. Accordingly, the cache line 71 may include an ASDT index value 69 allowing rapid identification of the necessary entry in the ASDT 36 to be updated. In one embodiment, an ASDT index value 69 may also be stored in a Mis-Status Handling Register (MSHR) used to handle cache miss requests in standard computer architectures so that the ASDT 36 entry corresponding to a cache line returned on a cache miss, to be placed in cache 18, can be updated.

Cache Coherence with Other Processors

Referring to FIG. 1, other processor systems 12 may write to data in their caches that invalidates a cache line 71 in the cache of the given processor systems 12*a*. This will generate an invalidation message normally describing the data to be invalidated using a physical address. One way to identify the necessary cache line 71 for invalidation is to apply the physical address of the invalidation message to the ASDT 36 to obtain the key virtual address 58 and to use that key virtual address 58 to identify the necessary cache line 71. In embodiments where there are other types of coherence events in addition to invalidation messages, a similar procedure to consult the ASDT 36 and to identify the necessary cache line 71 could be employed. The present invention will typically find greatest use on the L1 cache 18*a* and coherence events between the L2 and L1 caches are rare, minimizing this overhead.

Load and Store Queues

Referring now to FIG. 1, the load queue 17 and store queue 9 are used in out of order processors to manage memory reads and writes. Using virtual addresses for the store queue 19 can create problems if a later load does not identify a matching store due to synonyms and vice versa. In such cases, stale data could be returned from the cache 18. Similarly, using virtual addresses for the load queue can create problems when there is a coherence-based invalidation or eviction in cache 18 and a load has been carried out (speculatively) for that evicted data. The present invention may address this issue by identifying data in the load queue 17 and store queue 19 by the key virtual address 58 and not by a synonym. Once a load or store is (speculatively) executed, its key virtual address 58 is identified and kept in the load or store queue. Accesses using the load queue 17 and store queue 19 with a synonym (not the key virtual address 58) thus cause a cache miss in cache 18 ultimately resulting in a replaying of the operation (load or store) with the key virtual address 58 via the ART 34 lookup of process block 54 (or via ASDT 36 lookup of process block 84).

A TLB miss for a store in the store queue 19 may be resolved properly by holding younger stores in a separate queue until the TLB miss is resolved. An alternative is to restart the program from the offending store to effectively delay the release of the store instruction from a store queue.

Large Page Sizes

For large page sizes the bit vector 72 of ASDT 36 may become unwieldy. In this case one may eliminate the bit vector 72 and instead "walk" through the lines of the cache 18 to search for lines from a given page related to a desired line to be evicted from the ASDT 36. This expensive operation can be avoided by preferably evicting from the ASDT 36 lines associated with small rather than large pages especially if there is a need to evict an entry with a non-zero value of counter 76. Generally, the eviction of large pages will also be less likely events.

Access of the SS and ART

Referring now to FIGS. 7a-7d, the access of the SS 32 and the ART 34 in a pipeline processor can be implemented in a variety of ways. As shown in FIG. 6a, access to SS 32 and ART 34 can occur after address generation but before disambiguation. This approach achieves most of the power efficiency benefit of using a virtual cache but does not fully exploit potential latency benefits.

As shown in FIG. 6b, in an alternative, the SS 32 and ART 34 can be accessed in parallel during the disambiguation stage. The disambiguation may need to be done with the key virtual addresses 58 on hits in the ART 34 although they are rare. This may increase power consumption but decrease latency.

As shown in FIG. 6c, access to SS 32 can occur before address generation based on base (or segment) registers, and access to ART 34 can occur after address generation and before disambiguation. This approach can be applied to both instruction and data caches and obtains most of the energy and latency benefits possible with virtual caches.

Alternatively as shown in FIG. 6d, if address generation is a multi-step process, SS 32 can be accessed after intermediate steps of address generation but before address generation is complete.

Optimizations

Accesses to ART 34 can be reduced by exploiting the fact that successive references are often to the same page (especially for instructions). In one embodiment, a last LVA (LLVA) register 100 (shown in FIG. 4) may be associated with the ART 34 which maintains the last key virtual address 58 that was accessed. When a next virtual address being accessed is the same as that contained in the LLVA 100, access to the ART 34 need not occur and this value in the LLVA 100 can be used directly, skipping process block 54 of FIG. 2.

Each process may be associated with a different virtual address memory space which consists of a user and a kernel space. The kernel space is shared across different processes and thus accesses to the kernel space can be considered as synonyms because a different process has a different ASID although the accessed virtual addresses in the kernel space are same. This can create multiple entries in the ART 34 when the kernel space is accessed in a temporal proximate manner by multiple processes. To avoid the associated overhead, one embodiment may use a run time remapping of an ASID to a single unique value only for accesses to the kernel space. The identification of such access is based on a priori knowledge that the access has an address range associated with a kernel access. For example, if the kernel space (or operating system) is located in the upper half of address space, this remapping can simply look at the highest order address bit to trigger the remapping process.

With respect to all of the embodiments described above, it should be noted that the above described structures described above can be implemented entirely in hardware to provide fast performance consistent with the necessary high speed of cache data transfers.

While the above description has focused on the L1 cache, it will be appreciated that these principles may be extended to other caches as may prove advantageous in reducing memory access latency.

The invention contemplates that each data storage structure, including the ART 34, the ASDT 36 and the cache line 71, may store virtual addresses together with address space identifiers (ASID) uniquely identifying each virtual address space and thus effectively being a portion of the virtual address.

In one embodiment, the SS 32 and the ART 34 may be eliminated in favor of direct access to the cache 18 with a synonym Vb and the expectation that if the synonym Vb is not a key virtual address, that a cache miss will result and the proper key synonym resolved by access to the ASDT 36 after the cache miss per process block 60.

It will be appreciated from the above description that the data storage functionality of the SS 32, the ART 34, and the ASDT 36, providing data employed by the synonym tracking circuitry 35, and the synonym tracking circuitry 35 itself may be distributed in a variety of ways among the circuitry of the computer processor system 10 or interprocessor circuitry, in particular, the data of the SS 32, ART 34 and ASDT 36 may be freely stored in a variety of different locations including in the cache 18 itself. In that latter case, the physical cache should be understood to have a regular cache component and a synonym tracking component each which may be the subject of separate claim elements.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a processor" should be understood to include one or more microprocessors, that can communicate in a stand-alone and/or a distributed environment(s), and can thus be configured to communicate via wired or wireless communications with other processors, where such one or more processor can be configured to operate on one or more processor-controlled devices that can be similar or different devices. It should also be understood that a processor could be a general-purpose processor, a processing core, a context of a multithreaded processor, a graphics processing unit, a special-purpose processor, or any other form of processor that carries out operations that access a memory, as is understood in the art. Furthermore, references to memory, unless otherwise specified, can include one or more processor-readable and accessible memory elements and/or components that can be internal to the processor-controlled device, external to the processor-controlled device, and can be accessed via a wired or wireless network.

in addition, it will be appreciated that the represented data structures, including tables and signatures, are intended to provide logical depictions of the data and the disclosed invention should be considered to include other physical arrangement of data that also provide the indicated function.

The terms "index", "indexed" and the like, as used herein, should be understood to refer generally to the process of using a value to locate and access information related to that value, in the manner of a book index, and is not intended to be limited to the technical meaning of index in the context of a cache memory.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An electronic processor architecture for use with a memory having storage at physical addresses comprising:
   a processor;
   a memory cache;
   a cache control circuit caching memory data of a physical address by a virtual address;
   a translation circuit translating a virtual address into a physical address; and
   a synonym tracking circuit receiving a given virtual address from the processor for access to the memory cache and comprising:
   a first table providing at least one entry linking multiple virtual addresses together to indicate that those virtual addresses are synonyms referencing data of a common physical address in the memory cache;
   a second table providing at least one entry linking a given physical address with a virtual address to indicate that the linked physical address and virtual address reference common data and further indicating the presence of data of the given physical address in the memory cache;
   the synonym tracking circuit:
   (1) determining if the given virtual address is a synonym with an other virtual address mapping to a same given physical address of data in the memory cache by review of the first table;
   (2) when the given virtual address is a synonym according to the first table, accessing the memory cache using the other virtual address as an accessing address for the memory cache;
   (3) if the given virtual address is not in the memory cache, translating the given virtual address into a given physical address and if the given physical address is linked to a second virtual address in the second table, updating the first table to link the given virtual address and the second virtual address.

2. The electronic processor of claim 1 wherein the memory cache holds data of a physical address accessible only by a virtual address.

3. The electronic processor of claim 1 wherein each other virtual address is a key virtual address being a synonym of multiple virtual addresses but a synonym of no other key virtual address.

4. The electronic processor of claim 1 wherein when the given virtual address is not a synonym with another virtual address per the first table, the synonym tracking circuit accesses the memory cache using the given virtual address as the accessing address for the memory cache.

5. The electronic processor of claim 1 wherein the first table linking multiple virtual addresses together provides multiple virtual addresses linked to the other virtual address.

6. The electronic processor of claim 1 wherein the first table further includes a set of memory access permissions associated with linked sets of virtual addresses and wherein when the other virtual address is used as the accessing addresses, accesses to the memory cache are controlled by the permissions of the first table.

7. The electronic processor of claim 1, wherein the synonym tracking circuit includes compressed signatures of at least some of the virtual addresses in the first table, the compressed signatures indicating whether a given virtual address is likely in the first table and wherein the synonym tracking circuit performs a first check of the compressed signatures and checks the first table only if a compressed signature identified by the first check indicates that the given virtual address is likely in the first table.

8. The electronic processor of claim 1, wherein when the given virtual address is not in the memory cache, and when the given physical address links to a second virtual address in the second table, using the second virtual address of the second table as an accessing address for the memory cache.

9. The electronic processor of claim 8 wherein the second table further associates linked physical addresses and virtual addresses with memory access permissions which control the access of memory when using a linked physical and virtual address.

10. The electronic processor of claim 8 wherein a line of the memory cache holds an index to a corresponding entry of the second table linked to a corresponding virtual address and wherein the synonym tracking circuit receives the index to identify an entry in the second table for updating when a line of a memory cache is evicted or invalidated.

11. The electronic processor of claim 8 wherein only a single key virtual address in the second table links to a given physical address.

12. The electronic processor of claim 11 wherein the processor is an out of order processor using a load queue and a store queue and wherein a data in the load queue and the store queue store is linked to a key virtual address.

13. The electronic processor of claim 8 wherein the translation circuit uses a translation lookaside buffer and a page table to convert a given virtual address to a physical address.

14. The electronic processor of claim 8 wherein the second table may further identify to each physical address of the second table, subsets of data of the physical address in the memory cache and the cache control circuit may use the second table to identify portions of a physical address of the second table enrolled in the memory cache.

15. The electronic processor of claim 8 wherein the second table provides a counter associated with a physical address indicating a number of subsets of that physical address enrolled in the memory cache.

16. A method of caching data in an electronic processor computer system of a type including at least one processor together with a memory cache, and a cache control circuit caching memory data of physical addresses by virtual addresses, the processor further including a translation circuit translating between a virtual address from the processor and a physical address; and a synonym tracking circuit including a first table providing at least one entry linking multiple virtual addresses together to indicate that those virtual addresses are synonyms referencing data of a common physical address in the memory cache, a second table providing at least one entry linking a physical address with a virtual address to indicate that the linked physical address and virtual address reference common data and further indicating the proems of data of the given physical address in the memory cache, the synonym circuit receiving a given virtual address from the processor to determine if the given virtual address is a synonym with an other virtual address mapping to a same given physical address of data in the memory cache; and when the given virtual address is a synonym, accessing the memory cache using the other virtual address as an accessing address for the memory cache, the method comprising:

(1) saving data in the memory cache using a virtual address wherein the memory cache holds at least a portion of the virtual address; and
(2) accessing data from the memory cache using a given virtual address by first determining if the given virtual address has a linked synonym virtual address for accessing the memory cache by review of the first table and if so using the linked synonym virtual address for accessing the memory cache; and
(3) if the given virtual address is not in the memory cache, translating the given virtual address into a given physical address and if the given physical address is linked to a second virtual address in the second table, updating the first table link the given virtual address and the second given virtual address.

17. The method of claim 16 wherein the step of saving data in the memory cache using a virtual address allows access to the saved data only with a virtual address.

18. The method of claim 16 wherein the linked virtual address is a synonym of multiple virtual addresses but a synonym of no other key virtual address.

19. The method of claim 16 wherein the memory cache is accessed using an accessing address providing an index portion to select an entry of the memory cache and a tag portion to compare against tag bits of the entry and wherein the index portion and tag portion are both parts of a same virtual address.

20. The method of claim 16 wherein the memory cache holds data of a physical address accessible only by a virtual address.

21. The electronic processor of claim 1 wherein the accessing address used to access the memory cache includes an index portion to select an entry of the memory cache and a tag portion to compare against tag bits of the entry and wherein the index portion and tag portion are both parts of a same virtual address.

22. The electronic processor of claim 1 further including an eviction circuit controlling eviction of a given virtual address from at least one of the first table and the second table based on a count indicating a number of corresponding subsets of data associated with the given virtual addresses and held in the memory cache.

23. The electronic processor of claim 1 wherein the first table is separately accessed from the memory cache.

24. The electronic processor of claim 1 wherein the translation circuit translates a virtual address from the processor into a physical address using data linking virtual addresses with physical addresses and being accessed separately from the second table.

25. An electronic processor architecture for use with a memory having storage at physical addresses comprising:
a processor;
a memory cache;
a first table providing at least one entry linking multiple virtual addresses together when those virtual addresses are synonyms referencing data of a common physical address;
a second table providing at least one entry linking physical addresses with virtual addresses;
a cache control circuit caching memory data of a physical address by a virtual address;
a translation circuit translating a virtual address from the processor into a physical address, the translation circuit communicating with a page table and a cache of the page table; and
a synonym tracking circuit receiving a first virtual address from the processor and applying the first virtual address to the memory cache and in the event of a cache miss, translating the first virtual address into a given physical address and in the event that the given physical addresses is in the second table, adding a link between the first virtual address and a second key virtual address from the second table to the first table.

26. An electronic processor architecture for use with a memory having storage at physical addresses comprising;
a processor;
a memory cache;
a cache control circuit caching memory data of a physical address by a virtual address;
a translation circuit translating a virtual address into a physical address; and
a synonym tracking circuit receiving a given virtual address from the processor for access to the memory cache and comprising:
a first table providing at least one entry linking multiple virtual addresses together to indicate that those virtual addresses are synonyms referencing data of a common physical address in the memory cache;
a second table providing at least one entry linking a given physical address with a virtual address to indicate that the linked physical address and virtual address reference common data and further indicating the presence of data of the given physical address in the memory cache;
the synonym tracking circuit:
(1) determining if the given virtual address is a synonym with an other virtual address mapping to a same given physical address of data in the memory cache by review of the first table;
(2) when the given virtual address is a synonym according to the first table, accessing the memory cache using the other virtual address as an accessing address for the memory cache;
(3) evicting an entry from the first table based on an eviction of corresponding data from the memory cache.

* * * * *

UNITED STATES PATENT AND TRADEMARK OFFICE
CERTIFICATE OF CORRECTION

PATENT NO. : 10,089,240 B2
APPLICATION NO. : 14/867926
DATED : October 2, 2018
INVENTOR(S) : Gurindar S. Sohi et al.

Page 1 of 1

It is certified that error appears in the above-identified patent and that said Letters Patent is hereby corrected as shown below:

In the Claims

Claim 16, Column 15, Line 15, delete "proems" and substitute therefor -- presence --.

Signed and Sealed this
Twentieth Day of November, 2018

Andrei Iancu
*Director of the United States Patent and Trademark Office*

UNITED STATES PATENT AND TRADEMARK OFFICE
CERTIFICATE OF CORRECTION

PATENT NO. : 10,089,240 B2
APPLICATION NO. : 14/867926
DATED : October 2, 2018
INVENTOR(S) : Gurindar S. Sohi et al.

Page 1 of 1

It is certified that error appears in the above-identified patent and that said Letters Patent is hereby corrected as shown below:

In the Drawings

Sheet 3, Fig. 6, the reference "60" should be --69--.

In the Claims

Column 14, Line 20, Claim 6 "addresses" should be --address--.

Column 15, Line 64, Claim 22 "addresses" should be --address--.

Column 16, Line 30, Claim 25 "addresses" should be --address--.

Signed and Sealed this
Eighteenth Day of June, 2019

Andrei Iancu
*Director of the United States Patent and Trademark Office*

UNITED STATES PATENT AND TRADEMARK OFFICE
CERTIFICATE OF CORRECTION

PATENT NO. : 10,089,240 B2
APPLICATION NO. : 14/867926
DATED : October 2, 2018
INVENTOR(S) : Gurindar S. Sohi et al.

Page 1 of 1

It is certified that error appears in the above-identified patent and that said Letters Patent is hereby corrected as shown below:

In the Specification

Column 11, Line 14:
Delete "6a" and substitute therefor – 7a –

Column 11, Line 19:
Delete "6b" and substitute therefor – 7b –

Column 11, Line 25:
Delete "6c" and substitute therefor – 7c –

Column 11, Line 31:
Delete "6d" and substitute therefor – 7d –

Signed and Sealed this
Seventh Day of July, 2020

Andrei Iancu
*Director of the United States Patent and Trademark Office*